United States Patent
Kwon (10) Patent No.: US 10,713,479 B2
(45) Date of Patent: Jul. 14, 2020

(54) MOTION RECOGNITION METHOD AND MOTION RECOGNITION DEVICE FOR RECOGNIZING MOTION OF USER RECEIVED VIA NUI DEVICE BY COMPARING WITH PRESET COMPARISON TARGET INFORMATION

(71) Applicant: STARSHIP VENDING-MACHINE CORP., Seoul (KR)

(72) Inventor: Ji-yong Kwon, Seoul (KR)

(73) Assignee: STARSHIP VENDING-MACHINE CORP., Seoul (KR)

( * ) Notice: Subject to any disclaimer, the term of this patent is extended or adjusted under 35 U.S.C. 154(b) by 0 days.

(21) Appl. No.: 15/425,039

(22) Filed: Feb. 6, 2017

(65) Prior Publication Data

US 2017/0147873 A1 May 25, 2017

Related U.S. Application Data

(63) Continuation of application No. PCT/KR2015/006475, filed on Jun. 25, 2015.

(30) Foreign Application Priority Data

Aug. 7, 2014 (KR) .................. 10-2014-0101620

(51) Int. Cl.
| | |
|---|---|
| *G06F 3/01* | (2006.01) |
| *G06T 7/73* | (2017.01) |
| *G06K 9/00* | (2006.01) |
| *G06K 9/48* | (2006.01) |

(Continued)

(52) U.S. Cl.
CPC .......... *G06K 9/00355* (2013.01); *G06F 3/011* (2013.01); *G06F 3/017* (2013.01); *G06K 9/00201* (2013.01); *G06K 9/481* (2013.01); *G06K 9/52* (2013.01); *G06K 9/6215* (2013.01);
(Continued)

(58) Field of Classification Search
None
See application file for complete search history.

(56) References Cited

U.S. PATENT DOCUMENTS

| | | | | |
|---|---|---|---|---|
| 2013/0278501 | A1* | 10/2013 | Bulzacki | ................ G06F 3/017 |
| | | | | 345/157 |
| 2014/0134586 | A1* | 5/2014 | Stein | ..................... G09B 23/28 |
| | | | | 434/262 |

FOREIGN PATENT DOCUMENTS

| | | |
|---|---|---|
| CN | 102319130 A | 1/2012 |
| JP | 2003-062326 A | 3/2003 |
| JP | 2010-033163 A | 2/2010 |

(Continued)

OTHER PUBLICATIONS

Meinard Muller, Tido Roder, and Michael Clausen, Efficient Content-Based Retrieval of motion Capture Data, ACM Transactions on Graphics (TOG), Jul. 2005, pp. 677-685, vol. 24, Issue 3, Association for Computing Machine (ACM), New York, NY, USA.

*Primary Examiner* — Idowu O Osifade
(74) *Attorney, Agent, or Firm* — Korus Patent, LLC; Seong Il Jeong (57) ABSTRACT

The present invention relates to a motion recognition method and a motion recognition device; and provides a method for recognizing an actual motion of a user by acquiring information about a motion of a user and performing dynamic time-warping between the information about the motion and preset comparison target information. Accordingly, the motion of the user can be accurately and rapidly recognized.

18 Claims, 2 Drawing Sheets

(51) Int. Cl.
*G06K 9/52* (2006.01)
*G06K 9/62* (2006.01)

(52) U.S. Cl.
CPC ...... *G06T 7/73* (2017.01); *G06T 2207/30196* (2013.01)

(56) References Cited

FOREIGN PATENT DOCUMENTS

| | | |
|---|---|---|
| JP | 2011-003136 A | 1/2011 |
| JP | 2012-066026 A | 4/2012 |
| JP | 2013-257656 A | 12/2013 |
| KR | 10-2004-0055310 A | 6/2004 |
| KR | 10-2010-0002803 A | 1/2010 |
| KR | 10-2011-0047776 A | 5/2011 |
| KR | 10-2012-0000807 A | 1/2012 |
| KR | 10-2013-0111248 A | 10/2013 |
| KR | 10-2014-0024421 A | 2/2014 |
| KR | 10-2014-0028064 A | 3/2014 |

* cited by examiner

MOTION RECOGNITION METHOD AND MOTION RECOGNITION DEVICE FOR RECOGNIZING MOTION OF USER RECEIVED VIA NUI DEVICE BY COMPARING WITH PRESET COMPARISON TARGET INFORMATION

TECHNICAL FIELD

The present invention relates to a motion recognition method and a motion recognition device, and more particularly to a method and device that can accurately and efficiently recognize a motion of a user by rapidly determining comparison target information corresponding to the motion of the user.

BACKGROUND ART

Recently, NUI devices which input commands to a computer by using voices or motions of a user, rather than a method of inputting text or the like, have been developed and popularized.

However, currently popularized NUI devices merely identify motions of a user by tracking the locations of joints based on the motions of the user. Additionally, attempts have been made to interpret voices or motions of the user input via the NUI devices.

As one of the attempts, a dynamic time-warping technique has been proposed. That is, to identify a command meant by any motion, there is required a technology for verifying whether a motion previously defined for a corresponding command matches a current motion performed by a user. For this technology, a dynamic time-warping technique has been proposed.

According to a dynamic time-warping technique, when two sequences are given as M and N, computation corresponding to O(MN) is commonly performed. Additionally, when J is the number of all joints, computation corresponding to O(MNJ) must be performed. When it is assumed that the number of defined motions to be compared with a current motion performed by a user is K, computation corresponding to O(MNJK) must be performed. Such high computational complexity poses the problem of requiring extensive computing resources and a long period of time.

Furthermore, according to a dynamic time-warping technique, scaling must be performed to compare an input motion of a user with a predefined motion. In this case, since the size of a body varies depending on each user or the extent of detail of a motion operation must vary, a problem arises in that the motion of the user is recognized as an absolutely different motion.

In connection with this, Korean Patent Application Publication No. 10-2012-0000807 (published on Jan. 4, 2012), i.e., a prior art technical document, discloses a control device comprising a motion recognition unit configured to recognize a plurality of motions and a control unit configured to control a digital device based on the motions recognized by the motion recognition unit; wherein the control unit stops the control of the digital device based on the motions recognized by the motion recognition unit when the motion recognition unit recognizes a first one of the plurality of motions, and performs the control of the digital device based on the motions recognized by the motion recognition unit when a second one of the plurality of motions is recognized. That is, although the prior art technical document describes a technology for recognizing a motion and determining control based on the recognized motion, it does not disclose a method of effectively recognizing a motion, and thus the above-described problem is not yet overcome.

Accordingly, there is a need for a technology for overcoming the above-described problem.

Meanwhile, the above-described background technology corresponds to technical information that has been possessed by the present inventor in order to contrive the present invention or that has been acquired in the process of contriving the present invention, and cannot be necessarily viewed as a well-known technology that had been known to the public before the filing of the present invention.

DISCLOSURE

Technical Problem

An object of an embodiment of the present invention is to accurately recognize a motion of a user.

Furthermore, an object of an embodiment of the present invention is to represent an input motion of a user with a binary vector via an NUI device, thereby minimizing the computation time required to determine the meaning of a motion of a user.

Technical Solution

As a technical solution for accomplishing the above objects, according to a first aspect of the present invention, there is provided a method for recognizing a motion of a user, the method including: acquiring information about a motion of a user; and performing dynamic time-warping between the information about the motion and preset comparison target information.

According to a second aspect of the present invention, there is provided a device for recognizing a motion of a user received via an NUI device, the device including: a motion information acquisition unit configured to acquire information about a motion of a user; and a motion determination unit configured to perform dynamic time-warping between the information about the motion and preset comparison target information.

As a technical solution for accomplishing the above objects, according to a third aspect of the present invention, there is provided a computer-readable storage medium having stored thereon a program for performing the method including: acquiring information about a motion of a user; and performing dynamic time-warping between the information about the motion and preset comparison target information.

As a technical solution for accomplishing the above objects, according to a fourth aspect of the present invention, there is provided a computer program including a computer program code configured to cause a computer to perform the method including: acquiring information about a motion of a user; and performing dynamic time-warping between the information about the motion and preset comparison target information.

Advantageous Effects

According to any one of the above-described technical solutions, an embodiment of the present invention can accurately recognize a motion of a user. In particular, the size of a body or a minute difference in motion that must vary depending on each user will not be an obstacle to the accurate determination of a motion intended by a user.

Furthermore, according to any one of the above-described technical solutions, the computational time required to determine the meaning of a motion of a user can be minimized by representing the motion of the user, input via an NUI device, with a binary vector. Furthermore, when the motion of the user is represented with the binary vector, the sequences of binary vectors have the same value for successive two poses, and thus animations having the same length can be converted into a small number of poses.

The advantageous effects that can be acquired by the present invention are not limited to the above-described advantageous effects, and other effects that have not been described will be apparently understood by those having ordinary knowledge in the art, to which the present invention pertains, from the following description.

MODE FOR INVENTION

Embodiments of the present invention will be described in detail below with reference to the accompanying drawings so that those having ordinary knowledge in the art to which the present invention pertains can easily practice the present invention. However, the present invention may be implemented in various different forms, and are not limited to the embodiments described herein. Furthermore, in the drawings, parts unrelated to descriptions are omitted in order to clearly describe the present invention, and similar reference symbols are assigned to similar components throughout the specification.

Throughout the specification, when a part is described as being "connected" to another part, this includes not only a case where they are "directly connected" to each other but also a case where they are "electrically connected" to each other with another element interposed therebetween. Furthermore, when a part is described as "including" a component, this means that another component is not be excluded from the part but may be included in the part, unless particularly described to the contrary.

The present invention will be described in detail below with reference to the accompanying diagrams.

Figure 1:
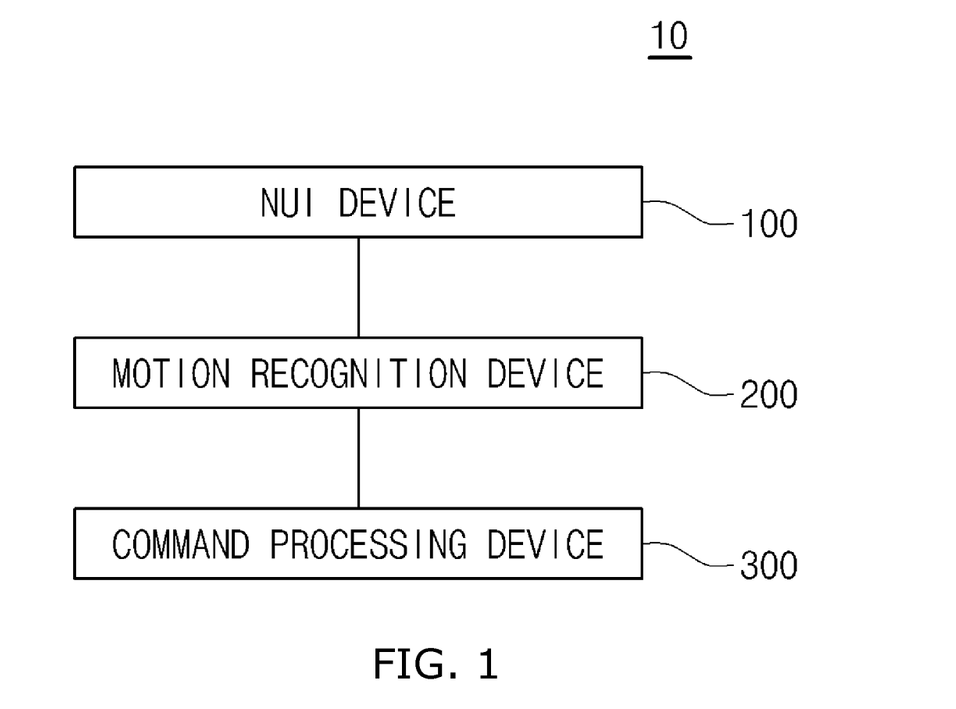
FIG. 1 is a diagram showing the configuration of a system for recognizing a motion of the user via an NUI device according to an embodiment of the present invention.

Referring to FIG. 1, a system 10 according to an embodiment of the present invention includes an NUI device 100 and a motion recognition device 200.

In the present invention, the NUI device 100 refers to any device that can recognize a motion or voice of a user by means of at least one of an image sensor, a depth sensor, a motion sensor, and a voice sensor and that can use the recognized information for a command for a software program or an application. The NUI device 100 may be implemented using, for example, a tablet PC, a smartphone, an RGB camera, a depth camera, or Kinect on which a touch screen is mounted. When the NUI device 100 according to the present invention is implemented using, for example, a depth camera, the NUI device 100 may photograph a motion of the user and transmit a photographed image frame, or the NUI device 100 may photograph a motion of the user, extract pose information, including 3D locations of a joint of the user, from a photographed image frame, and transmit the extracted pose information.

That is, the NUI device 100 may photograph all or part of the body of the user and identify a body part of the user, or may track the 3D location of a joint or the motion of the joint, thereby acquiring a frame including pose information including 3D locations of the joint of the user. Furthermore, the NUI device 100 may transmit the acquired pose information or frame to the motion recognition device 200 via a wired/wireless communication means.

Meanwhile, the motion recognition device 200 may acquire information about a motion of the user by analyzing the pose information received from the NUI device 100 (or by extracting pose information from the received image frame and analyzing the extracted pose information), may compare the information about the motion with preset comparison target information, may accurately recognize the motion of the user in the real world, and may determine a command corresponding to the motion of the user.

In this case, the "information about a motion" refers to sequence information when poses of the user are arranged in time order, and the "comparison target information" is information about the definition of the meaning or command of a motion of the user and may be stored in the motion recognition device 200 in advance.

The motion recognition device 200 may perform part of a function that is performed by the NUI device 100. For example, the NUI device 100 may be included in the motion recognition device 200, or the NUI device 100 may be included in the motion recognition device 200 and the motion recognition device 200 may perform at least part of the function of the NUI device 100. In the following, for ease of description, at least part of the function of the NUI device 100 will be described as being performed by the motion recognition device 200. The more detailed configuration of the motion recognition device 200 will be described with reference to FIG. 2.

Meanwhile, the system 10 according to the embodiment of the present invention may further include a command processing device 300.

Accordingly, when the meaning of a motion of the user in the real world is determined by the motion recognition device 200 and a command corresponding to the meaning is present, the command may be transmitted to the command processing device 300 via a wired/wireless communication means and a process corresponding to the command may be performed.

Accordingly, for example, when the command processing device 300 is a device for displaying a cursor on the screen of an electronic device and a motion of a specific joint is defined by a motion of the cursor as the comparison target information, the motion may be acquired as pose information by the NUI device 100 when the user moves the specific joint, the motion recognition device 200 may determine a command corresponding to the motion of the user as a result by performing dynamic time-warping between the information about the motion acquired based on the pose information and the comparison target information, and the command processing device 300 may perform a process corresponding to the command, i.e., a process of moving the cursor on the screen across the screen.

Although the command processing device 300 is shown as being separate from the motion recognition device 200 in FIG. 1 for ease of description, the command processing device 300 may be included in the motion recognition device 200 or may include the motion recognition device 200.

In the following, referring to FIG. 2, the configuration of the motion recognition device 200 according to the embodiment of the present invention will be described in greater detail.

Figure 2:
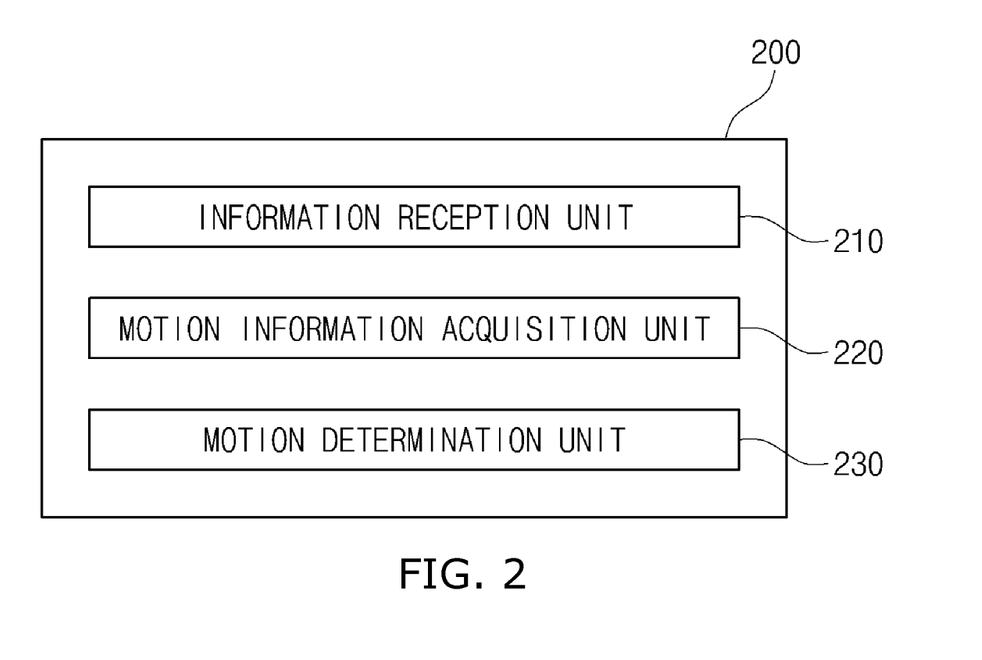
FIG. 2 is a block diagram showing a motion recognition device according to an embodiment of the present invention.

As shown FIG. 2, motion recognition device 200 includes an information reception unit 210, a motion information acquisition unit 220, and a motion determination unit 230.

The information reception unit 210 may receive the image frame photographed by the NUI device 100, or may receive the pose information extracted from the image frame.

In connection with this, when the user performs a series of motions on the NUI device 100 in the real world, the series of motions are defined as an "actual motion" of the user for ease of description. The NUI device 100 may photograph an actual motion of the user every second, acquire an image frame including pose information constituting the actual motion, and transmit the image frame to the motion recognition device 200, or may extract pose information from the image frame, and transmit the pose information to the motion recognition device 200.

Accordingly, the information reception unit 210 may receive the image frame or the pose information, and may extract pose information from the image frame information when the reception unit 210 receives the image frame. The above-described pose information may include 3D locations of the joint of the user, and may be defined in greater detail, as follows:

$$P_t = \{p_t^i, v_t^i | i \in J\} \qquad \text{<Equation 1>}$$

In the above equation, i is the number of a joint, J is a set of joints, t is the frame in which a pose has been recorded, $p_t^i$ is the 3D location of the corresponding joint, and $v_t^i$ is the linear speed of the corresponding joint. Since the motion of the user is input in the form of a series of sequences, $v_t^i$ may be calculated in the form of a discrete differential $$\frac{1}{h}(p_t^i - p_{t-1}^i),$$

in which case h refers to the period of time between two frames.

Meanwhile, the motion information acquisition unit 220 acquires information about the motion of the user.

That is, the motion information acquisition unit 220 may convert each of a series of pieces of pose information corresponding to the actual motion of the user into a binary vector, and may set the resulting binary vector as the information about the motion of the user.

Figure 3:
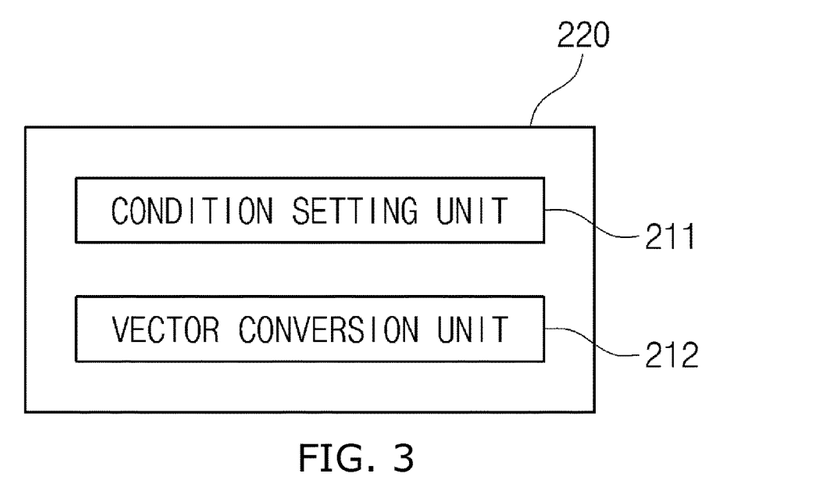
FIG. 3 is a block diagram showing a motion information acquisition unit according to an embodiment of the present invention.

The motion information acquisition unit 220 may include a condition setting unit 221, and a vector conversion unit 222.

The condition setting unit 221 generates a conditional expression in which each of the series of pieces of pose information corresponding to the actual motion of the user is used as a factor.

For this purpose, the condition setting unit 221 may set one or more meta-condition functions, and may generate a conditional expression by determining at least one of elements constituting the meta-condition functions. That is, each of the meta-condition functions may include one or more variables and constants, and the condition setting unit 221 may generate a conditional expression by determining at least one of the constants.

In connection with this, the condition setting unit 221 may set a plane condition function, i.e., a function for determining the location of a certain joint based on a plane generated based on two or more joints, as the meta-condition function, and the plane condition function may be expressed as Equation 2 or 3 below:

$$C_{p1}(i,j,k,l,o) = n_1 \cdot (p^i - p^l) - o|n_1| \qquad \text{<Equation 2>}$$

$$C_{p2}(i,j,k,l,o) = n_2 \cdot (p^i - p^l) - o|n_2| \qquad \text{<Equation 3>}$$

In this case, i refers to the number of the joint, i.e., a target for the condition, j, k and l refer to the numbers of the joints, i.e., references for the condition, and o refers to an offset value adapted to determine the front or back of the plane. Furthermore, the plane may be defined by using a method for providing three joints or a method for using a vector, formed by two joints, as a normal vector and allowing the vector to pass through the location of another joint. Accordingly, $n_1$ may be derived based on $(p^j - p^l) \times (k^k - p^l)$, and $n_2$ may be derived based on $(p^k - p^j)$.

According to Equations 2 and 3, there may be generated a conditional expression adapted to determine whether a left hand or right hand is present in front of a trunk plane expressed by a right shoulder, a left shoulder and a pelvis, and whether a left hand is present inside or outside a body based on a plane that uses a vector extending from a right shoulder to a left shoulder as a normal and passes through the left shoulder.

Furthermore, the condition setting unit 221 may set a function, such as Equation 4 below, i.e., an angle condition function capable of generating a conditional expression for determining whether an angle formed by four joints falls within a specific range, as the meta-condition function.

$$C_\alpha(i,j,k,l,s,t) = (\alpha - s)(t - \alpha) \qquad \text{<Equation 4>}$$

In this case, Equation 4 may generate a positive value if an angle α formed by a vector connecting designated joints i and j and a vector connecting designated joints k and l falls between S and t, and may generate a negative value otherwise. That is, α is angle($p^j - p^i, p^l - p^k$), and a positive value or negative value may be determined depending on whether α falls within a predetermined range. That is, using the angle condition function may generate various conditional expressions for determining whether the angle of an elbow is straight or bent, for determining whether both arms are spread or parallel by examining an angle between vectors extending from both shoulders to hands, etc.

Furthermore, the condition setting unit 221 may set an access condition function, such as Equation 5, as a meta-condition function, and the access condition function may generate a conditional expression for determining whether the distance between 2 joints falls within a specific range. That is, the condition setting unit 221 may generate a conditional expression using two joints, i.e., targets of a condition, two joints, i.e., references of the condition, and a magnification constant value as input, and the access condition function may be expressed by Equation 5 below:

$$C_n(i,j,k,l,s) = |p^j - p^i|^2 - s^2|p^l - p^k|^2 \qquad \text{<Equation 5>}$$

In this case, according to Equation 5, there may be generated a conditional expression for generating a negative value if the distance between the designated i and j is shorter than a value obtained by multiplying a reference joint distance by S and to generate a positive value if the distance is longer than the value. Accordingly, using the access condition function may generate various conditional expressions for determining whether both hands are present in close proximity to each other, for determining whether a right hand holds a head, etc.

Meanwhile, the condition setting unit 221 may set a meta-condition function for generating a conditional expression regarding a speed condition. That is, the condition setting unit 221 may set each of a speed direction condition function, such as Equation 6, and a speed magnitude condition function, such as Equation 7, as the meta-condition function.

Equation 6 is an equation representative of a speed direction condition function capable of generating a conditional expression for determining whether an angle formed by the speed of any joint and a vector connecting designated two reference joints fall within a designated range.

$$C_d(i,j,k,s,t)=(\beta-s)(t-\beta) \qquad \text{<Equation 6>}$$

In this case, $\beta$ is $\text{angle}(v^i, p^k - p^j)$.

Based on the speed direction condition function of Equation 6, the condition setting unit 221 may generate various conditional expressions for determining whether a right hand is vertically or laterally moved, for determining whether a foot is vertically or laterally moved, etc.

Meanwhile, Equation 7 is a speed magnitude condition function capable of generating a conditional expression for determining how much the magnitude of the speed of any joint is greater than a vector connecting designated two reference joints when they are compared with each other.

$$C_m(i,j,k,s,t)=|v^i|^2-s^2|p^k-p^j|^2 \qquad \text{<Equation 7>}$$

The function according to Equation 6 has a possibility that it may generate an error because it operates regardless of the magnitude of the speed. However, when the function according to Equation 6 is used along with the speed magnitude condition function according to Equation 7, setting may be made such that a conditional expression is meaningful only for a speed equal to or larger than a reference value.

As described above, using the meta-condition function, the condition setting unit 221 may generate various conditional expressions.

The vector conversion unit 222 may acquire information about the motion by converting the motion of the user into a binary vector according to the conditional expression generated by the condition setting unit 221.

That is, the vector conversion unit 222 may acquire a binary value corresponding to each piece of pose information by inputting each pose information included in a pose set corresponding to information about the motion of the user as a factor of the conditional expression, thereby generating a binary vector regarding a motion including a series of pose information and acquiring the binary vector as the information about the motion.

Meanwhile, the motion determination unit 230 may determine comparison target information matching the actual motion of the user by comparing the information about the motion with the comparison target information.

The motion determination unit 230 may include a storage unit (not shown) configured to store comparison target information, or may communicate with a storage device (not shown), for example, a database, located in the outside.

That is, one or more comparison target information are present. A certain comparison target information, which is closest to the actual motion of the user, may be determined among the one or more comparison target information by performing dynamic time-warping between each of comparison target information and the information about the motion.

Furthermore, when a command corresponding to the determined comparison target information is present, the motion determination unit 230 may detect that a command corresponding to the actual motion of the user has been input.

Figure 4:
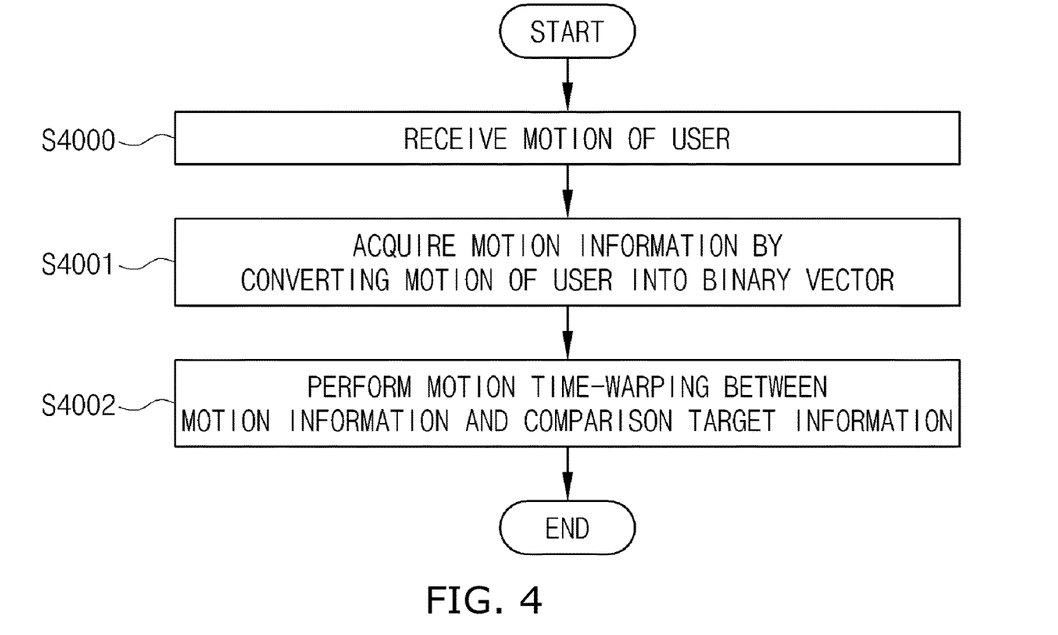
FIG. 4 is a flowchart illustrating a motion recognition method according to an embodiment of the present invention.

Meanwhile, the motion recognition method according to the embodiment shown in FIG. 4 includes steps that are processed in the interface provision device 200 shown in FIGS. 2 and 3 in a time sequential manner. Accordingly, the items that are omitted below but have been described in conjunction with the interface provision device 200 may be also applied to the method according to the embodiment shown in FIG. 4.

First, the motion recognition device 200 may receive an actual motion of a user at step S4000. In this case, the motion recognition device 200 may receive a series of image frames corresponding to the actual motion of the user via the NUI device 100. Once the image frames have been received, the motion recognition device 200 may receive the motion of the user by extracting pose information from each of the image frames. Furthermore, the pose information extraction process is performed by the NUI device 100, and thus the motion recognition device 200 may receive the motion of the user by receiving the pose information.

Furthermore, the motion recognition device 200 may acquire information about the motion by converting the motion of the user into a binary vector based on the pose information including 3D locations of a joint of the user at step S4001.

For this purpose, the motion recognition device 200 may generate various conditional expressions for generating a binary vector corresponding to the motion of the user by using a meta-condition function.

For example, the motion recognition device 200 may generate a conditional expression for determining whether "a left hand is present in front of a body" or "a right hand is present in front of the body" according to Equation 2.

Furthermore, for example, the motion recognition device 200 may generate a conditional expression for determining whether "a left hand is present outside a body," "a right hand is present outside the body," "the left hand is present inside the body," "the right hand is present inside the body," "the left hand is present above a trunk," "the right hand is present above the trunk," "the left hand is present above a head" or "the right hand is present above the head" according to Equation 3.

Furthermore, for example, the motion recognition device 200 may generate a conditional expression for determining whether "the angle formed by the elbow of a left arm falls within a range from 0° to 60°," "the angle formed by the elbow of the left arm falls within a range from 60° to 120°," "the angle formed by the elbow of the left arm falls within a range from 120° to 180°," "the angle formed by the elbow of a right arm falls within a range from 0° to 60°," "the angle formed by the elbow of the right arm falls within a range from 60° to 120°," "the angle formed by the elbow of the right arm falls within a range from 120° to 180°," "the angle formed by a left knee falls within a range from 0° to 60°," "the angle formed by the left knee falls within a range from 60° to 120°," "the angle formed by the left knee falls within a range from 120° to 180°," "the angle formed by a right knee falls within a range from 0° to 60°," "the angle formed by the right knee falls within a range from 60° to 120°," "the angle formed by the right knee falls within a range from 120° to 180°," "the angle formed by both arms falls within a range from 0° to 60°," "the angle formed by both arms falls within a range from 60° to 120°," or "the angle formed by both arms falls within a range from 120° to 180° according to Equation 4.

Furthermore, for example, the motion recognition device 200 may generate a conditional expression for determining whether "both hands are present in close proximity to each other," "a left hand is present in close proximity to a head" or "a right hand is present in proximity to the head" according to Equation 5.

Furthermore, for example, the motion recognition device 200 may generate a conditional expression for determining whether "the speed direction of a left hand is a vertical direction," "the speed direction of a right hand is a vertical direction," "the speed direction of the left hand is a horizontal direction" or "the speed direction of the right hand is a horizontal direction" according to Equation 6.

Furthermore, for example, the motion recognition device 200 may generate a conditional expression for determining whether "the speed of a left hand is at a level at which the left hand passes through both shoulders within one second," or "the speed of a right hand is at a level at which the right hand passes through both shoulders within one second" according to Equation 7.

The above-described conditional expressions may be generated after or before steps S4000 to S4002, i.e., the individual steps of FIG. 4, are performed, or may be generated during the individual steps.

Pose information based on the motion of the user may be applied to the various conditional expressions generated as described above, and thus binary vectors corresponding to motions of the user may be generated. For example, the motion recognition device 200 may set 30 or more conditional expressions, and thus may generate 30 or more-dimensional binary vectors corresponding to motions of the user.

Furthermore, the binary vectors generated as described above may be set as information about motions, and the motion recognition device 200 may perform dynamic time-warping between the above-described information about the motion and comparison target information at step S4002. When the dynamic time-warping is performed, the calculation of the difference between the information about the motion converted into the binary vectors and the comparison target information may be simply performed using a logical operation between both binary vectors.

When a command corresponding to a motion determined by dynamic time-warping is present, the motion recognition device 200 may allow the command processing device 300 to process the command.

The method described via FIG. 4 may be implemented may also be implemented in the form of a storage medium including computer-executable instructions, such as a program module executed by a computer. A computer-readable medium may be any available medium accessible to a computer, and includes all volatile and non-volatile media and separable and non-separable media. Furthermore, the computer-readable medium may include both a computer storage medium and a communication medium. The computer storage medium includes all volatile and non-volatile media and separable and non-separable media implemented using any method or technique for storing information, such as computer-readable instructions, data structures, program modules, and other data. The communication medium typically includes computer-readable instructions, data structures, program modules, other data of a modulated data signal, such as carriers, or other transmission mechanisms, and also includes any information transfer media.

Furthermore, the method according to an embodiment of the present invention may be implemented using a computer program (or a computer program product) including a computer-executable instructions. The computer program includes programmable machine instructions processed by a processor, and may be implemented using a high-level programming language, an object-oriented programming language, an assembly language, or a machine language. Furthermore, the computer program may be recorded on a variety of types of computer-readable storage media (e.g., memory, a hard disk, a magnetic/optical medium, or a solid-state drive (SSD)).

Accordingly, the method according to an embodiment of the present invention may be implemented when a computer program, such as that described above, is executed by a computing device. The computing device may include at least some of a processor, memory, a storage device, a high-speed interface connected to the memory and a high-speed extension port, and a low-speed interface connected to a low-speed bus and the storage device. These components are interconnected using various buses, and may be mounted on a common motherboard or may be mounted using other appropriate methods.

In this case, the processor may process instructions within the computing device. The instructions may be, for example, instructions stored in memory or a storage device in order to display graphic information adapted to provide a graphic user interface (GUI) on an external input/output device, such as a display connected to a high-speed interface. As another embodiment, a plurality of processors and/or a plurality of buses may be appropriately used along with a plurality of pieces of memory and a plurality of memory forms. Furthermore, the processor may be implemented using a chipset formed by chips that include a plurality of analog and/or digital processors.

Furthermore, the memory stores information within the computing device. As an example, the memory may include a volatile memory unit or a set of volatile memory units. As another example, the memory may include a non-volatile memory unit or a set of non-volatile memory units. Furthermore, the memory may be another type of computer-readable medium, such as a magnetic or optical disk.

Furthermore, the storage device may provide a large storage space to the computing device. The storage device may be a computer-readable medium, or may be a component including the computer-readable medium. For example, the storage device may also include devices within a storage area network (SAN) or other components, and may be a floppy disk device, a hard disk device, an optical disk device, a tape device, flash memory, or a similar semiconductor memory device or device array.

The above detailed description of the present invention is merely for an illustrative purpose. It will be understood that those having ordinary knowledge in the art to which the present invention pertains can easily make modifications and variations without departing from the technical spirit and essential features of the present invention. Therefore, the above-described embodiments are illustrative in all aspects, and are not limitative. For example, each component described as being in a single form may be practiced in a distributed form. In the same manner, components described as being in a distributed form may be practiced in an integrated form.

The scope of the present invention is defined by the attached claims, rather than the detailed description. Furthermore, all modifications and variations derived from the meanings, scope and equivalents of the claims should be construed as falling within the scope of the present invention.

What is claimed is:

1. A method for recognizing a motion of a user received via an NUI device, which is performed by a motion recognition device, the method comprising:
   (a) acquiring information about a motion of a user;
   (b) determining a comparison target information which is matched to the motion of the user among one or more preset comparison target information by performing dynamic time-warping between the information about the motion and each of the preset comparison target information; and
   (c) detecting that a command corresponding to the determined comparison target information has been input,
   wherein step (a) comprises:
   (a-1) configuring the motion of the user, and converting the motion of the user into a binary vector based on one or more pose information including 3D locations of a joint of the user; and
   (a-2) setting the binary vector as the information about the motion of the user,
   wherein the binary vector is a bit array which is comprised of binary values output from conditional expressions, and
   wherein each of the conditional expressions uses the pose information as a factor, and outputs the binary values corresponding to the pose information.

2. The method of claim 1, wherein step (a-1) comprises:
   setting a meta-condition function;
   generating the conditional expression by determining at least one of one or more elements constituting the meta-condition function; and
   converting the motion of the user into the binary vector according to the conditional expression.

3. The method of claim 2, wherein converting the motion of the user into the binary vector according to the conditional expression comprises converting each of one or more pose information constituting the motion of the user, into the binary vector according to the conditional expression and setting a set of binary vectors as information about the motion.

4. The method of claim 2, wherein:
   setting the meta-condition function comprises setting a plane condition function as the meta-condition function; and
   the plane condition function is a function for determining a location of a certain joint based on a plane generated based on two or more joints.

5. The method of claim 2, wherein:
   setting the meta-condition function comprises setting an angle condition function as the meta-condition function; and
   the angle condition function is a function for determining, if a plurality of vectors are connected to two or more joints respectively, whether an angle of each of the plurality of vectors falls within a predetermined range.

6. The method of claim 2, wherein:
   setting the meta-condition function comprises setting an access condition function as the meta-condition function; and
   the access condition function is a function for determining whether a distance between two or more joints falls within a predetermined range.

7. The method of claim 2, wherein:
   setting the meta-condition function comprises setting a speed direction condition function as the meta-condition function; and
   the speed direction condition function is a function for determining whether a speed of a certain joint and a vector connecting two or more joints fall within a predetermined range.

8. The method of claim 2, wherein:
   setting the meta-condition function comprises setting a speed magnitude condition function as the meta-condition function; and
   the speed magnitude condition function is a function for determining whether a difference between a speed of a vector connecting two or more joints and a speed of a certain joint falls within a predetermined range.

9. A computer-readable storage medium having stored thereon a program for performing the method set forth in claim 1.

10. A computer program stored in a medium to perform the method set forth in claim 1 in combination with a computer device.

11. A device for recognizing a motion of a user received via an NUI device, the device comprising:
    a processor configured to acquire information about a motion of a user, determine a comparison target information which is matched to the motion of the user among one or more preset comparison target information by performing dynamic time-warping between the information about the motion and each of the preset comparison target information, and detect that a command corresponding to the determined comparison target information has been input;
    wherein the processor configures the motion of the user, converts the motion of the user into a binary vector based on one or more pose information including 3D locations of a joint of the user, and sets the binary vector as the information about the motion of the user,
    wherein the binary vector is a bit array which is comprised of binary values output from conditional expressions, and
    wherein each of the conditional expressions uses the pose information as a factor, and outputs the binary values corresponding to the pose information.

12. The device of claim 11, wherein:
    the processor sets a meta-condition function and to generate the conditional expression by determining at least one of one or more elements constituting the meta-condition function, and converts the motion of the user into the binary vector according to the conditional expression.

13. The device of claim 12, wherein the processor converts each of one or more pose information constituting the motion of the user, into the binary vector according to the conditional expression and sets a set of binary vectors as information about the motion.

14. The device of claim 12, wherein:
    the processor sets a plane condition function as the meta-condition function; and
    the plane condition function is a function for determining a location of a certain joint based on a plane generated based on two or more joints.

15. The device of claim 12, wherein:
    the processor sets an angle condition function as the meta-condition function; and
    the angle condition function is a function for determining, if a plurality of vectors are connected to two or more joints respectively, whether an angle of each of the plurality of vectors falls within a predetermined range.

16. The device of claim 12, wherein:

the processor sets an access condition function as the meta-condition function; and the access condition function is a function for determining whether a distance between two or more joints falls within a predetermined range.

17. The device of claim 12, wherein:

the processor sets a speed direction condition function as the meta-condition function; and the speed direction condition function is a function for determining whether a speed of a certain joint and a vector connecting two or more joints fall within a predetermined range.

18. The device of claim 12, wherein:

the processor sets a speed magnitude condition function as the meta-condition function; and the speed magnitude condition function is a function for determining whether a difference between a speed of a vector connecting two or more joints and a speed of a certain joint falls within a predetermined range.

* * * * *